United States Patent
Ostergren

(10) Patent No.: US 8,050,243 B2
(45) Date of Patent: Nov. 1, 2011

(54) METHOD AND SYSTEM FOR EVALUATING PROXIMITY TO A WLAN FOR A UMA/GAN COMPATIBLE ELECTRONIC DEVICE

(75) Inventor: Mattias Ostergren, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 984 days.

(21) Appl. No.: 11/960,802

(22) Filed: Dec. 20, 2007

(65) Prior Publication Data

US 2009/0161639 A1 Jun. 25, 2009

Related U.S. Application Data

(60) Provisional application No. 61/012,306, filed on Dec. 7, 2007.

(51) Int. Cl.
*H04W 4/00* (2009.01)
*H04W 24/00* (2009.01)

(52) U.S. Cl. .................. 370/338; 455/435.2; 455/456.1; 455/457

(58) Field of Classification Search ................... None
See application file for complete search history.

(56) References Cited

U.S. PATENT DOCUMENTS

| 2004/0106379 A1 | 6/2004 | Zen et al. |
| 2006/0035636 A1 | 2/2006 | Pirila |
| 2006/0246887 A1* | 11/2006 | Barclay et al. ............... 455/423 |
| 2007/0021126 A1* | 1/2007 | Nanda et al. ............... 455/456.1 |
| 2007/0133487 A1* | 6/2007 | Wang et al. ................... 370/338 |
| 2007/0167174 A1 | 7/2007 | Halcrow et al. |
| 2007/0202887 A1* | 8/2007 | Counts et al. .............. 455/456.1 |
| 2008/0181187 A1* | 7/2008 | Scott et al. .................... 370/338 |

FOREIGN PATENT DOCUMENTS

| EP | 0858237 | 8/1998 |
| EP | 1612999 | 1/2006 |
| WO | 0128272 | 4/2001 |
| WO | 2007022005 | 2/2007 |

OTHER PUBLICATIONS

International Preliminary Report on Patentability from corresponding International Application No. PCT/IB08/001560.
International Search Report and Written Opinion from corresponding International Application No. PCT/IB2008/001560.

* cited by examiner

*Primary Examiner* — Daniel J Ryman
*Assistant Examiner* — John Blanton
(74) *Attorney, Agent, or Firm* — Renner, Otto, Boisselle & Sklar, LLP

(57) ABSTRACT

A method and system for evaluating proximity of the electronic device to a wireless local area network (WLAN) involves generating a location where the location is defined by a list of cellular communication access points that is sorted based on signal strength for each access point. The list may be scored against one or more similarly defined reference locations to determine if the electronic device is at a geographic position that is favorable to probe for a WLAN that the electronic device was connected to at a prior time, but is presently not connected.

10 Claims, 4 Drawing Sheets

METHOD AND SYSTEM FOR EVALUATING PROXIMITY TO A WLAN FOR A UMA/GAN COMPATIBLE ELECTRONIC DEVICE

RELATED APPLICATION DATA

This application claims priority from U.S. Provisional Application No. 61/012,306, filed Dec. 7, 2007.

TECHNICAL FIELD OF THE INVENTION

The technology of the present disclosure relates generally to network access for a mobile electronic device and, more particularly, to a system and method for evaluating proximity to a wireless local area network (WLAN) for an electronic device that is configured to communicate over plural types of network interfaces.

BACKGROUND

The network connectivity options for mobile electronic devices, such as mobile telephones, are increasing. For example, unlicensed mobile access (UMA), also known as generic access network (GAN), is a telecommunications principle that allows seamless handover of a mobile electronic device between a wireless local area network (WLAN) and a cellular radio access technology. Radio access technologies include, for example, global system for mobile communications (GSM), code division multiple access (CDMA), wideband CDMA (WCDMA), and general packet radio service (GPRS). WLAN technologies include, for example, unlicensed spectrum technologies such as WiFi (e.g., a network based on the IEEE 802.11 standard) and WiMax (e.g., a network based on the IEEE 802.16 standard).

In UMA/GAN operation, a mobile telephone may communicate with a service provider's core switching network over a WLAN connection. That is, during WLAN connectivity, packet switched and circuit switched data signals may be transmitted over Internet protocol (IP) connections. If the WLAN connection is lost, call and data signals may be transmitted over an available radio access technology connection. It may be preferable for the mobile telephone to rediscover a formerly connected WLAN as the mobile telephone moves. Probing for a known WLAN consumes a relatively large amount of power and radio circuit resources. Therefore, probing for WLAN access when there is a low probability that the WLAN is within communication range is an inefficient use of mobile telephone resources.

SUMMARY

To improve the manner in which a mobile electronic device probes for known WLANs, the present disclosure describes an improved method and system for evaluating proximity of the electronic device to a wireless local area network (WLAN). The technique involves generating a location where the location is defined by a list of cellular communication access points that is sorted based on signal strength for each access point. The list may be scored against one or more similarly defined reference locations to determine if the electronic device is at a geographic position that is favorable to probe for a WLAN that the electronic device was connected to at a prior time (but is presently not connected).

According to one aspect of the disclosure, a method of initiating a probe for a WLAN by a generic access network enabled electronic device includes generating a current location metric for the electronic device, the location metric being a list of cellular communication base station identifiers that have a relationship to a current position of the electronic device and are ordered in accordance with respective signal strength values that are ascertained at the current position; comparing the location metric with a reference location metric for the WLAN, the reference location metric being a list of cellular communication base station identifiers that have a relationship to a former position of the electronic device where the electronic device was connected to the WLAN and the base station identifiers for the reference location metric are ordered in accordance with respective signal strength values that were ascertained at the former position; and if the electronic device is connected to the WLAN and if the location metric has less than a first predetermined threshold geographic correlation with the reference location metric, associating the location metric with the WLAN as an additional reference location metric; else, if the location metric has greater than a second predetermined threshold geographical correlation to the location metric, initiating the probe.

According to one embodiment of the method of initiating the probe, the comparing includes generating a matching score having a value based on how well the order of the base station identifiers in the location metric corresponds to the order of the base station identifiers in the reference location metric.

According to one embodiment of the method of initiating the probe, the matching score is reduced if the location metric contains a base station identifier that is not in the reference location metric.

According to one embodiment of the method of initiating the probe, there are multiple WLANs and the WLANs are probed in an order determined by for each WLAN, comparing the location metric to reference location metrics for the WLAN to generate a geographic matching score for each comparison and determining a maximum one of the matching scores; and ordering the WLANs based on the maximum matching score for each WLAN.

According to one embodiment of the method of initiating the probe, if the electronic device is not connected to the WLAN, establishing a delay duration until a next current location metric for the electronic device is generated, the delay duration based on a geographical correspondence between the current location metric and the reference location metric.

According to one embodiment of the method of initiating the probe, the reference location metric has a highest geographical correspondence to the current location metric from a plurality of reference location metrics.

According to another aspect of the disclosure, a method of evaluating proximity of an electronic device to a WLAN includes generating a current location metric for the electronic device, the location metric defined by a list of cellular communication base station identifiers that is ordered based on signal strength values for each base station identifier; scoring the location metric for geographic correspondence to one or more reference location metrics, each reference location metric corresponding to a position at which the electronic device was connected to the WLAN and is defined by a list of cellular communication base station identifiers that are sorted based on signal strength values for each base station identifier at a time when the reference location metric was established; and determining if the geographical correspondence is favorable to probe for the WLAN based on a result of the scoring.

According to one embodiment of the method of evaluating proximity, the geographic correspondence between the location metric and each reference location metric is defined by a matching score that has a value based on how well the order of the base station identifiers in the location metric corresponds to the order of the base station identifiers in the reference location metric.

According to one embodiment of the method of evaluating proximity, the matching score is reduced if the location metric contains a base station identifier that is not in the reference location metric.

According to one embodiment, the method of evaluating proximity further includes probing for the WLAN if the determining is favorable.

According to one embodiment of the method of evaluating proximity, there are multiple WLANs and the WLANs are probed in an order determined by for each WLAN, comparing the location metric to reference location metrics for the WLAN to generate a geographic matching score for each comparison and determining a maximum one of the matching scores; and ordering the WLANs based on the maximum matching score for each WLAN.

According to one embodiment, the method of evaluating proximity further includes establishing a delay duration until a next current location metric for the electronic device is generated, the delay duration based on a geographical correspondence between the current location metric and the one or more reference location metrics.

According to another aspect of the disclosure, a generic access network enabled mobile electronic device includes a radio circuit that establishes communications with a core mobile communications network over a cellular communications base station or a WLAN depending on WLAN availability; and a controller that evaluates proximity to the WLAN, wherein the controller is configured to generate a current location metric for the electronic device, the location metric defined by a list of cellular communication base station identifiers that is ordered based on signal strength values for each base station identifier; score the location metric for geographic correspondence to one or more reference location metrics, each reference location metric corresponding to a position at which the electronic device was connected to the WLAN and is defined by a list of cellular communication base station identifiers that are sorted based on signal strength values for each base station identifier at a time when the reference location metric was established; and determine if the geographical correspondence is favorable to probe for the WLAN based on a result of the scoring.

According to one embodiment of the electronic device, the geographical correspondence between the location metric and each reference location metric is defined by a matching score that has a value based on how well the order of the base station identifiers in the location metric corresponds to the order of the base station identifiers in the reference location metric.

According to one embodiment of the electronic device, the matching score is reduced if the location metric contains a base station identifier that is not in the reference location metric.

According to one embodiment of the electronic device, the electronic device probes for the WLAN if the determination is favorable.

According to one embodiment of the electronic device, there are multiple WLANs and the controller is further configured to for each WLAN, compare the location metric to reference location metrics for the WLAN to generate a geographic matching score for each comparison and determine a maximum one of the matching scores; establish an order for the WLANs based on the maximum matching score for each WLAN; and control the electronic device to probe for the WLANs in the order of the WLANs.

According to one embodiment of the electronic device, the controller is further configured to establish a delay duration until a next current location metric for the electronic device is generated, the delay duration based on a geographical correspondence between the current location metric and the one or more reference location metrics.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
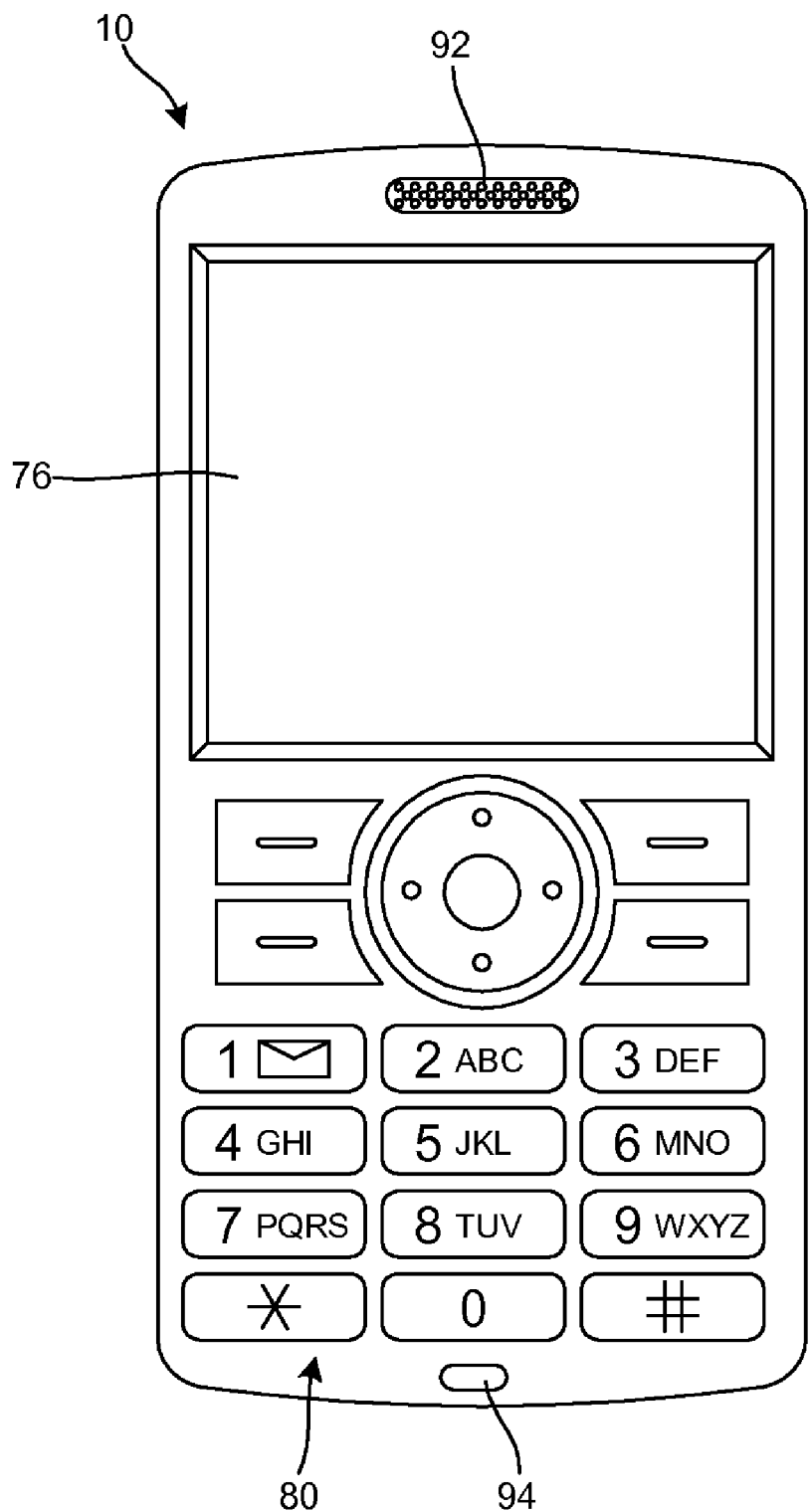
FIG. 1 is a schematic view of a mobile telephone as an exemplary mobile electronic device that includes a WLAN proximity evaluation function.

Embodiments will now be described with reference to the drawings, wherein like reference numerals are used to refer to like elements throughout. It will be understood that the figures are not necessarily to scale.

In this document, embodiments are described primarily in the context of a mobile telephone. But it will be appreciated that the described techniques could be carried out in operational environments other than the mobile telephone. Therefore, the term electronic device, as used herein, may relate to any type of appropriate electronic equipment, examples of which include a portable radio communication device (also referred to as a mobile radio terminal), a pager, a communicator, an electronic organizer, a personal digital assistant (PDA), a smartphone, a media player (e.g., an MP3 player and/or a video player), a gaming device and a computer.

Figure 2:
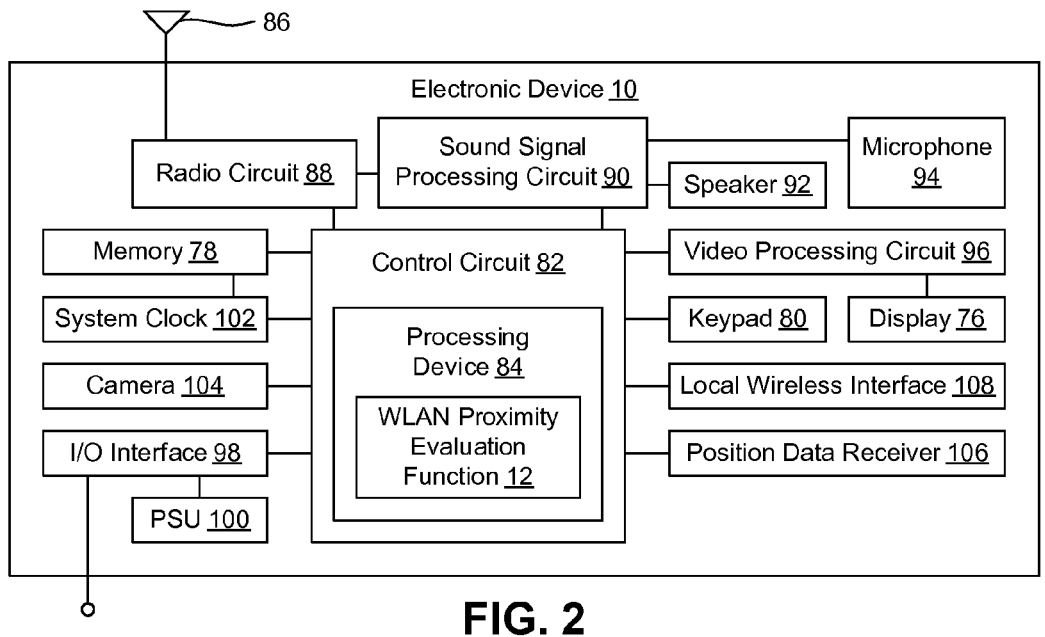
FIG. 2 is a schematic block diagram of the electronic device of FIG. 1.

Referring initially to FIGS. 1 and 2, an electronic device is shown. The electronic device 10 includes a WLAN proximity evaluation function 12 that is configured to evaluate proximity of the electronic device to one or more known WLANs and to probe for a specific WLAN if conditions are favorable for establishing connection to the WLAN. The term "probe," as used in this document, means to search for a particular WLAN that is associated with a certain identifier, such as a service set identifier (SSID).

Additional details and operation of the WLAN proximity evaluation function 12 will be described in greater detail below. The WLAN proximity evaluation function 12 may be embodied as executable code that is resident in and executed by the electronic device 10. In one embodiment, the WLAN proximity evaluation function 12 may be a program stored on a computer or machine readable medium. The WLAN proximity evaluation function 12 may be a stand-alone software application or form a part of a software application that carries out additional tasks related to the electronic device 10.

Figure 3:
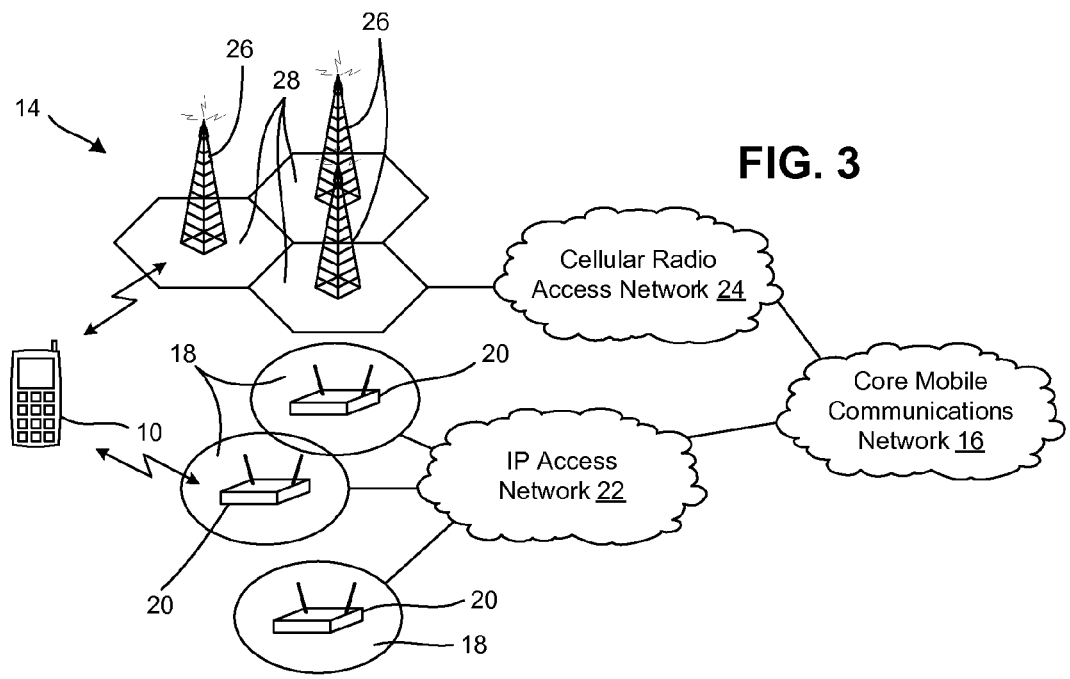
FIG. 3 is a schematic diagram of a communications system in which the electronic device of FIG. 1 may operate.

With additional reference to FIG. 3, the electronic device 10 may be configured with UMA/GAN functionality to operate as part of a communications system 14. The system 14 may include a core mobile communications network 16. The electronic device 10 may access the core mobile communications network 16 via a connection to a WLAN 18. At any given geographic position for the electronic device 10, there may be more than one available WLAN 18, but the electronic device 10 will typically establish a connection with one WLAN 18 through a wireless access point 20 that is associated with the WLAN 18. Each WLAN 18 may have one or more than one access point 20 and each WLAN 18 has an associated coverage area that is determined by the combined coverage area of each access point 20 in the WLAN 18. The WLANs 18 and the core mobile communications network 16 may be operatively networked together by an IP access network 22. The IP access network 22 may include a wide area network portion, such as the Internet.

When the electronic device 10 is not operatively connected to the WLAN 18, the electronic device may access the core mobile communications network 16 through a cellular radio access network 24 that is based on a radio access technology, such as GSM, CDMA, WCDMA, GPRS or other similar standard. The electronic device 10 communicates with the radio access network 24 through one of plural communications points, commonly referred to as base stations 26. Each base station 26 may have a coverage area 28, although overlap among coverage areas 28 is common. Also, each base station 26 may be uniquely identifiable. For example, in a GSM radio access network, each base station 26 may have a base station cell identity, or BSIC. Similarly, in a WCDMA radio access network, each base station 26 may be associated with a scrambling code (SC). The identifier for each base station 26 for the radio access network 24 will be generically referred to in this document as a cell ID. It will be appreciated that techniques described in this document are not dependent on the type of network or the type of base station. For example, the techniques may be used by an electronic device that is configured to use GSM, WCDMA, CDMA, another standard or more than one standard. Therefore, the term "cell ID" is not intended to be limited to the identification of communication access points for only "cellular" networks.

The core mobile communications network 16 may have a server (or servers) for managing calls placed by and destined to the electronic device 10, transmitting data to the electronic device 10 and carrying out any other support functions. As will be appreciated, the server may be configured as a typical computer system used to carry out server functions and may include a processor configured to execute software containing logical instructions that embody the functions of the server and a memory to store such software. The communications system 14 may support the communications activity of multiple mobile telephones and other types of end user devices.

The technique for determining an appropriate time to probe for a particular WLAN may have two phases. A first phase involves comparing geographical location references made from sorted lists of cell IDs and associated signal strength information with a location update. If the electronic device 10 is connected to a WLAN, the results of the comparison may be used to generate a new location reference. If the electronic device 10 is not connected to a WLAN, the results of the comparison may be used to determine if the electronic device 10 should probe for a WLAN. The second phase involves determining an order in which known WLANs should be probed if the first phase arrives at a determination that a favorable occasion to probe exists.

Figure 4:
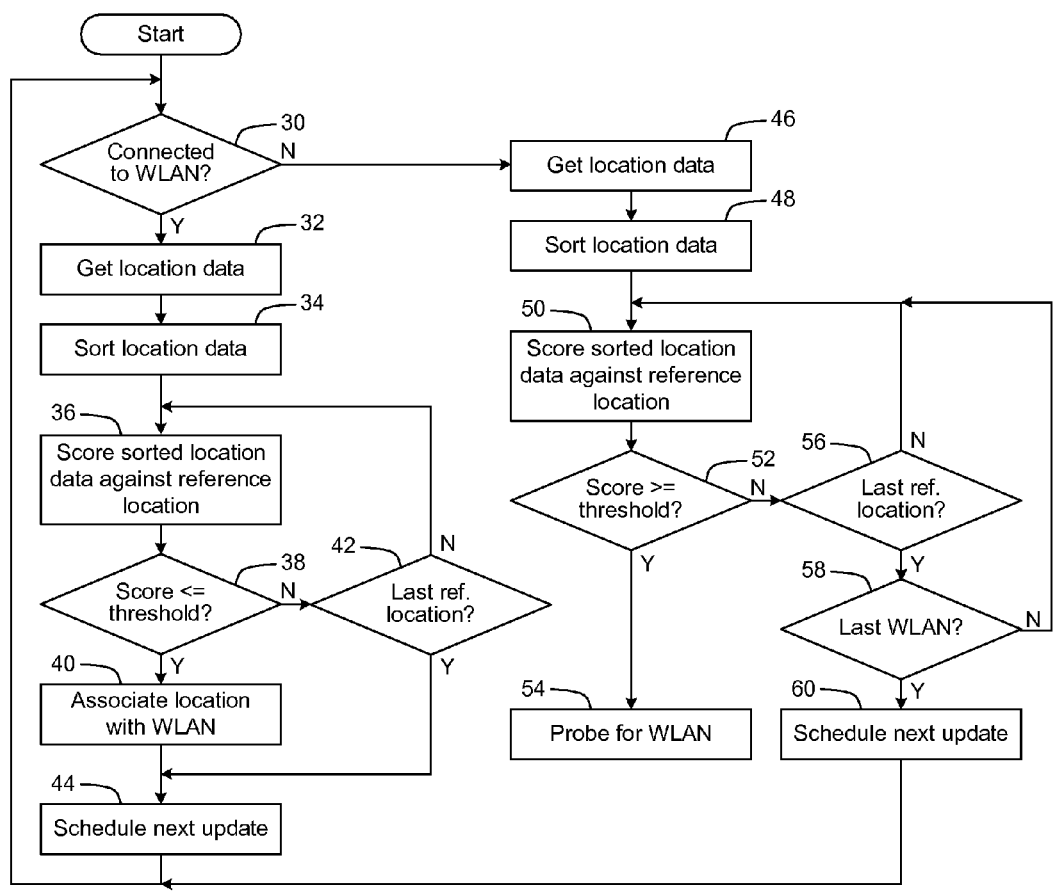
FIG. 4 is a flow chart representing an exemplary method of WLAN proximity evaluation using the electronic device of FIG. 1.

With additional reference to FIG. 4, illustrated are logical operations to implement an exemplary method of evaluating proximity to a WLAN. The exemplary method may be carried out by executing an embodiment of the WLAN proximity evaluation function 12, for example. Thus, the flow chart of FIG. 4 may be thought of as depicting steps of a method carried out by the electronic device 10. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted.

The logical flow may start in block 30 where a determination is made as to whether the electronic device 10 is operatively connected to one of the WLANs 18. The term "connected," as used in this document, refers to the existence of an established session between the electronic device 10 and the WLAN 18.

If a connection to the WLAN 18 is present, a positive determination may be made in block 30 and the logical flow may proceed to block 32 where a location update is commenced. The location update may include collecting location data, including the cell ID of the base station 26 that is tasked with servicing the electronic device 10 if the connection to the WLAN 18 is lost and a signal strength value for the servicing base station 26. The location data may further include the cell ID of any base stations 26 neighboring the servicing base station 26 and a signal strength value for each of the neighboring base stations 26. The neighboring base stations 26 for which data is collected may include any base stations 26 having a signal detectable by the electronic device 10 or base stations 26 with a known geographic relationship with the servicing base station 26. The results of the location data collection of block 32 may be a collection of raw location data that may be organized as an array of cell IDs, where each cell ID in the array has an associated signal strength.

The raw location data obtained during the location update of block 32 may be sorted in block 34 to generate a location (also referred to as location L or simply "L"), where the location is an array of cell IDs and associated signal strength values. Sorting of the raw location data may include listing the location cell IDs in descending signal strength order so that the cell ID associated with the strongest signal strength has the first position in the list and the cell ID associated with the weakest signal strength is last. Table 1 shows an exemplary location L in the form of a sorted list of cell IDs and associated signal strength values where the signal strength for the first cell ID is higher than the signal strength for the second cell ID, the signal strength for the second cell ID is higher than the signal strength for the third cell ID and so forth (e.g., using the nomenclature from Table 1, $SS1 \geqq SS2 \geqq SS3 \geqq \ldots SSn$). In one embodiment, the number of cell IDs and associated signal strength values for the location L may be limited to a predetermined number of the number of cell IDs that correspond to the strongest signal strengths. For example, the location L may be limited to the cell IDs associated with the four strongest signal strengths.

TABLE 1

| Cell ID | Signal Strength (SS) Value |
|---|---|
| cell ID1 | SS1 |
| cell ID2 | SS2 |

TABLE 1-continued

| Cell ID | Signal Strength (SS) Value |
|---------|---------------------------|
| cell ID3 | SS3 |
| . | . |
| . | . |
| . | . |
| cell IDn | SSn |

Following block 34, the logical flow may proceed to block 36 where the location L is scored against one or more reference locations. Each reference location (also referred to as location M or simply "M") is a sorted list of cell IDs and associated signal strength values. For each reference location M, the comparison may be made in the form of a scoring function that returns a single value, such as an integer value, that indicates how well the location L matches the location M. If there are no preexisting reference locations, the current location L may be stored as a reference location for use in comparing against future location updates. In one embodiment, the number of cell IDs and associated signal strength values for each reference location M may be limited to a predetermined number of the number of cell IDs that correspond to the strongest signal strengths. For example, the location L may be limited to the cell IDs associated with the four strongest signal strengths.

The scoring of block 36 may be carried out using the logical steps identified in the following Pseudo-Code Listing 1.

Pseudo-Code Listing 1

```
Score(L,M):
    R = 0
    For each location L cell ID at position I
        Found = false
        For each location M cell ID at position J
            If L[I] = M[J] then
                R = R + table[I][J]
                Found = true
            End for
        If not Found then
            R = R - (table[1][1] + table[2][2] + .... + table[n][n])
    End for
    Return R
```

In Pseudo-Code Listing 1, R is a returned integer value for the score (or score (L,M)) of the comparison of location L to the compared reference location M. "I" indicates positions values (e.g., 1, 2, 3, ... n) in the ordered list of cell IDs for the update location L and "J" indicates position values (e.g., 1, 2, 3, ... n) in the ordered list of cell IDs for the reference location M. The table values are derived from a table of predetermined values where the table is effectively a matrix that maps cell IDs for location L against cell IDs for location M.

Table 2 is an exemplary table that may be used to for determining values to add to or subtract to the return score R as the scoring loops through relative positions I and J for cell IDs from the location L and the location M, respectively. The exemplary table involves four cell IDs for the location L and the location M. It will be appreciated that, in implementation, the table may be expanded or contracted to support any number of cell IDs for the location L and/or the location M. The values that populate the table are predetermined values that are established to quantify a correlation between the location L and the location M. The values may be selected based on system architecture of the mobile electronic device 10 and/or a predicted number of cell IDs in the location L and/or location M. Also, empirical data collection may be used to adjust the table values.

TABLE 2

| | Location M cell ID J = 1 | Location M cell ID J = 2 | Location M cell ID J = 3 | Location M cell ID J = 4 |
|---|---|---|---|---|
| Location L cell ID I = 1 | 32 | 0 | 0 | 0 |
| Location L cell ID I = 2 | 0 | 16 | 4 | 0 |
| Location L cell ID I = 3 | 0 | 4 | 8 | 2 |
| Location L cell ID I = 4 | 0 | 0 | 1 | 4 |

If a cell ID from the location L matches a cell ID from the location M, there is likely to be strong geographic correlation between the position of the electronic device 10 when the update location L is determined and the position of the electronic device 10 when the reference location M was determined. In this case, a table value at the intersection of the rank order (I value) of the cell ID for the location L and the rank order (J value) of the cell ID for the location M will be added to the accumulated return score value R as the comparison loops through the routine. If a cell ID from the location L has no matching cell ID from the location M, there is likely to be weak geographic correlation between the position of the electronic device 10 when the update location L is determined and the position of the electronic device 10 when the reference location M was determined. In this event, the accumulated return score will be decreased by a penalty amount. In the example Pseudo-Code Listing 1, the penalty amount is a perfect score amount. The perfect score amount is an amount that would be derived from the table if the order of the cell IDs in the location L matches the order of the cell IDs in the location M. Using the exemplary values in Table 2, the perfect score amount (and penalty amount) is sixty.

Using the exemplary values from Table 2, Table 3 shows a score that is generated when the order of cell IDs for location L match the order of cell IDs for location M, which would result in a perfect score.

TABLE 3

| I value | Location L cell ID | J value | Location M cell ID | Table Value |
|---|---|---|---|---|
| 1 | cell ID1 | 1 | cell ID1 | 32 |
| 2 | cell ID2 | 2 | cell ID2 | 16 |
| 3 | cell ID3 | 3 | cell ID3 | 8 |
| 4 | cell ID4 | 4 | cell ID4 | 4 |
| | | | Total | 60 |

Using the exemplary values from Table 2, Table 4 shows a score that is generated when the order of the last two cell IDs for location L are reversed relative to the order of last two cell IDs for location M, which would result in a less than perfect score.

TABLE 4

| I value | Location L cell ID | J value | Location M cell ID | Table Value |
|---|---|---|---|---|
| 1 | cell ID1 | 1 | cell ID1 | 32 |
| 2 | cell ID2 | 2 | cell ID2 | 16 |

TABLE 4-continued

| I value | Location L cell ID | J value | Location M cell ID | Table Value |
|---|---|---|---|---|
| 3 | cell ID4 | 3 | cell ID3 | 2 |
| 4 | cell ID3 | 4 | cell ID4 | 1 |
| | | Total | | 51 |

Table 5 shows various orders for the cell IDs of the exemplary location L having four cell IDs and the outcome scores when compared to the exemplary location M having four cell IDs in the order cell ID1, cell ID2, cell ID3 and cell ID4. As indicated, the perfect score using the exemplary values from Table 2 is sixty and the worst score (e.g., when there is no overlap between the cell IDs for location L and location M) is negative two hundred forty (e.g., −240).

TABLE 5

| Example Situation No. | cell ID for I = 1 | cell ID for I = 2 | cell ID for I = 3 | cell ID for I = 4 | Score |
|---|---|---|---|---|---|
| 1 | cell ID1 | cell ID2 | cell ID 3 | cell ID4 | 60 |
| 2 | cell ID1 | cell ID2 | cell ID4 | cell ID 3 | 51 |
| 3 | cell ID1 | cell ID 3 | cell ID2 | cell ID4 | 44 |
| 4 | cell ID1 | cell ID4 | cell ID 3 | cell ID2 | 40 |
| 5 | cell ID1 | cell ID 3 | cell ID4 | cell ID2 | 38 |
| 6 | cell ID1 | cell ID4 | cell ID2 | cell ID 3 | 37 |
| 7 | cell ID2 | cell ID1 | cell ID3 | cell ID4 | 12 |
| . | . | . | . | . | . |
| . | . | . | . | . | . |
| . | . | . | . | . | . |
| 25 | cell ID1 | cell ID2 | cell ID3 | cell ID5 | −4 |
| . | . | . | . | . | . |
| . | . | . | . | . | . |
| . | . | . | . | . | . |
| n | cell ID5 | cell ID6 | cell ID7 | cell ID8 | −240 |

As indicated by the scores of Table 5, when a location L has a high score (e.g., a perfect score or close to a perfect score), the location L is likely to be geographically close to the reference location M. As the score decreases, the geographic proximity of the location L to the location M is likely to be correspondingly more remote.

Following the scoring of block 36, the logical flow may proceed to block 38. In block 38 a determination may be made as to whether the returned score for the comparison of the location L with the reference location M is less than or equal to a predetermined threshold (referred to as Threshold_Store). The predetermined threshold may be less than the perfect score. For example, in the foregoing scoring example using the values from Table 2, the predetermined threshold may be a score of 51 or 44. In this manner, scores that indicate a close match of geographic proximity between the update location L and the reference location M will be excluded from becoming associated with the connected WLAN as described below in connection with block 40 to avoid duplication of reference locations that are associated with the WLAN.

If the returned score is less than or equal to the predetermined threshold, a positive determination may be made in block 38 and the logical flow may proceed to block 40. In block 40, the location L may be stored as a reference location for the currently connected WLAN. This association of the location L with the WLAN adds a reference location for use in future iterations of the logical flow.

If the returned score is greater than the predetermined threshold, a negative determination may be made in block 38 and the logical flow may proceed to block 42. In block 42, a determination may be made as to whether the location L has been compared against all reference locations that have been previously associated with the connected WLAN. If the location L has not been compared with each previously associated reference location M, the logical flow may return to block 36 to compare the location L against another of the reference locations M. If the location L has been compared to each reference location M, a positive determination may be made in block 42 and the logical flow may proceed to block 44. Also, the logical flow may proceed to block 44 after block 40.

In block 44, the next acquisition of location data may be scheduled. The scheduling may be made by setting a delay duration (referred to as Interval_Connected) that is to elapse before the commencement of the next iteration of the logical flow. In one embodiment, the duration may be about one second. After the length of time association with the scheduling of block 44 has expired, the logical flow may return to block 30 for the next iteration of the logical flow.

As indicated by the logical flow, the scoring and association determination is iterated for all reference locations. By making these comparisons and association determinations, the electronic device 10 effectively creates a logical map of the coverage area of the connected WLAN as indicated by detected base stations and corresponding signal strengths. The threshold of block 38 may be selected to minimize the duplication of reference locations. The reference locations that are added by operation of the logical flow serve to construct a database of locations in which WLAN service is expected to be available in the future.

The logical loop represented by blocks 36, 38, 40, 42 and 44 may be carried out using the logical steps identified in the following Pseudo-Code Listing 2. The lower case "w" following the WLAN is a designator of the WLAN 18 to which the electronic device 10 is connected. Each known WLAN 18 may have its own unique identifier w.

Pseudo-Code Listing 2

```
On location update:
    If electronic device is connected to WLAN_w then
        Location L = sorted cell IDs
        For each Location M previously associated with WLAN_w
            If Score(L,M) ≤ Threshold_Store then
                Associate Location L with WLAN_w
        Schedule location update at Interval_Connected
```

Returning to block 30, if the electronic device 10 is not connected to a WLAN 18, a negative determination may be made in block 30 and the logical flow may proceed to block 46 where a location update is commenced. The location update may include collecting location data as described in connection with block 32. For the sake of brevity, the logical operation of block 46 will be considered the same as the logical operation of block 32 and this logical operation will not be described again. Following block 46, the logical flow may proceed to block 48 where the raw location data obtained during the location update of block 46 may be sorted. For the sake of brevity, the logical operation of block 48 will be considered the same as the logical operation of block 34 and this logical operation will not be described again. In this respect, the logical flow may include one of block 32 or block 46 and one of block 34 or 48, and the logical operation of block 30 may be moved to follow the logical operations of block 32 (or 46) and block 34 (or block 48).

Following block 48, the logical flow may iterate over all known WLANs 18 (e.g., WLAN_1, WLAN_2, . . . WLANn) such that each reference location M that is associated with each of the known WLANs 18 may be compared to the current location L to generate matching scores. The matching score may be generated in the same manner that matching scores are generated in block 36. If a matching score that is greater than or equal to a predetermined threshold is generated, WLAN probing may be commenced. In other cases (e.g., the matching scores are less than the predetermined threshold), the next location update may be scheduled based on how well the current location L corresponds to the reference locations M for the known WLAN as indicated by the highest generated score for each WLAN.

This process, which will be described in greater detail below with respect to blocks 50 through 60, may be carried out using the logical steps identified in the following Pseudo-Code Listing 3. In Pseudo-Code Listing 3, Thresold_Close and Threshold_Far are predetermined scoring values such that Threshold_Match is greater than Threshold_Close, which is greater than Threshold_Far. Interval_Close and Interval_Far are location scheduling update delay durations such that Interval_Connected is less than Interval_Close, which is less than Interval_Far. In another embodiment, there may be more threshold values between Threshold_Close and Threshold_Far and more corresponding interval durations to achieve a desired balance between power consumption and how often to iterate the logical flow for the possibility to probe for one of the known WLANs 18. In this case, the thresholds may be ordered so that Threshold_Match$\geq$Threshold_Close$\geq \ldots \geq$Threshold_Far and location update scheduling is similarly ordered as Interval_Connected$\leq$Interval_Close$\leq \ldots \leq$Interval_Far.

---

Pseudo-Code Listing 3

---

On location update:
   If electronic device is not connected to a WLAN
     Location L = sorted cell IDs
     For each known WLAN_w
       For each location M associated with known WLAN_w
         If Score(L,M) $\geq$ Threshold_Match then
           Probe for known WLANs
         Else if Score(L,M) $\geq$ Threshold_Close then
           Schedule location update at Interval_Close
         Else if Score(L,M) $\geq$ Threshold_Far then
           Schedule location update at Interval_Far

---

As further explanation of these steps, following block 48, the logical flow may proceed to block 50 where the current update location L is scored by comparing the location L to one of the reference locations M for one of the WLANs 18. The scoring may be carried out in the same manner as the scoring of block 36 and, for the sake of brevity, will not be described again with respect to block 50.

Next, the logical flow may proceed to block 52 where the returned score is compared to a predetermined threshold, referred to as Threshold_Match. If the values from the example of Table 2 are used, an example value for Threshold_Match may be sixty, which corresponds to the above-described perfect matching score. It will be appreciated that a value that is lower that the perfect matching score may be used as the predetermined threshold. In most embodiments, the predetermined threshold may be selected to provide a relatively high degree of confidence that the electronic device 10 is in a geographic position that, if the electronic device 10 were to probe for the WLAN associated with the compared reference location M (representing a known location where WLAN connectivity should be available), then the electronic device 10 would be able to connect to the WLAN.

If the score is greater than or equal to the predetermined threshold, a positive determination may be made in block 52 and the logical flow may proceed to block 54. Features of block 54 will be described in greater detail below. Briefly, in block 54, the electronic device 10 may probe for at least one of the WLANs 18. The operation of block 52 has the effect of initiating a probe for a WLAN 18 when the electronic device is known to be at or close to a position from which connection to the WLAN 18 may be accomplished. For many hardware configurations, probing for the WLAN 18 may be considered to be costly in terms of power consumption. Therefore, the operation of the logical flow may conserve battery charge by increasing the probability that the electronic device 10 will connect to the WLAN 18 when a probe is carried out.

If, in block 52, the score is less than the threshold, the logical flow may proceed to block 56 where a determination is made as to whether each of the reference locations M associated with the WLAN have been compared to the update location L. If not all of the reference locations M have been compared, the logical flow may return to block 50 to compare the location L with another of the reference locations M.

If the location L has been compared to all of the reference locations M, then a positive determination may be made in block 56 and the logical flow may proceed to block 58. In block 58 a determination may be made as to whether the location L has been compared against the reference locations M for all of the known WLANs. If the reference locations M for all of the WLANs 18 have not been compared, the logical flow may return to block 50 to compare the location L with a first one of the reference locations M for another of the WLANs 18.

If the location L has been compared to all of the reference location M for all of the WLANs, then a positive determination may be made in block 58 and the logical flow may proceed to block 60. In block 60, the next acquisition of location data may be scheduled. The scheduling may be made by setting a duration until the commencement of the next iteration of the logical flow. The duration may be dependent upon an estimation of how close the electronic device 10 is to a reference location M in which connection to at least one of the WLANs 18 is probable. In one embodiment, the highest score that is established through the iterations of blocks 50, 52, 56 and 58 may be determined. This score may be compared to one or more predetermined thresholds, such as the above-described Threshold_Close and Threshold_Far, and any intermediate thresholds. If the values from the example of Table 2 are used, an example value for Threshold_Close may be forty-four and an example value for Threshold_Far may be negative two hundred and forty. In one embodiment, Threshold_Far may be the same as the lowest possible matching score.

If the score is less than the matching threshold of block 52 and greater than or equal to Threshold_Close, then a conclusion may be drawn that the electronic device 10 is relatively close in position to a position that would actually match a reference location M. In this situation, it may be desirable to have a relatively short delay until the next location update is commenced (e.g., establish a delay between location updates so that location updates are carried out more frequently than if the scores indicated that the electronic device 10 were further away from a matching location). In one embodiment, the delay duration may be set to an interval to correspond to the Threshold_Close, such as the above-described Interval_Close. If the values from the example of Table 2 are used, an example value for Interval_Close may be about three seconds.

If the score is less than the close threshold and greater than or equal to the next smallest threshold (e.g., Threshold_Far or an intermediate threshold, if present), then a conclusion may be drawn that the electronic device 10 is relatively remote in position to a position that would actually match a reference location M. In this situation, it may be desirable to have a relatively long delay until the next update is commenced (e.g., establish a delay between location updates so that location updates are carried out less frequently than if the scores indicated that the electronic device 10 were closer to a matching location). In one embodiment, the delay duration may be set to an interval to correspond to the Threshold_Far, such as the above-described Interval_Far. If the values from the example of Table 2 are used, an example value for Interval_Far may be about eight seconds.

After the length of time associated with the scheduling of block 60 has expired, the logical flow may return to block 30 for the next iteration of the logical flow.

Figure 5:
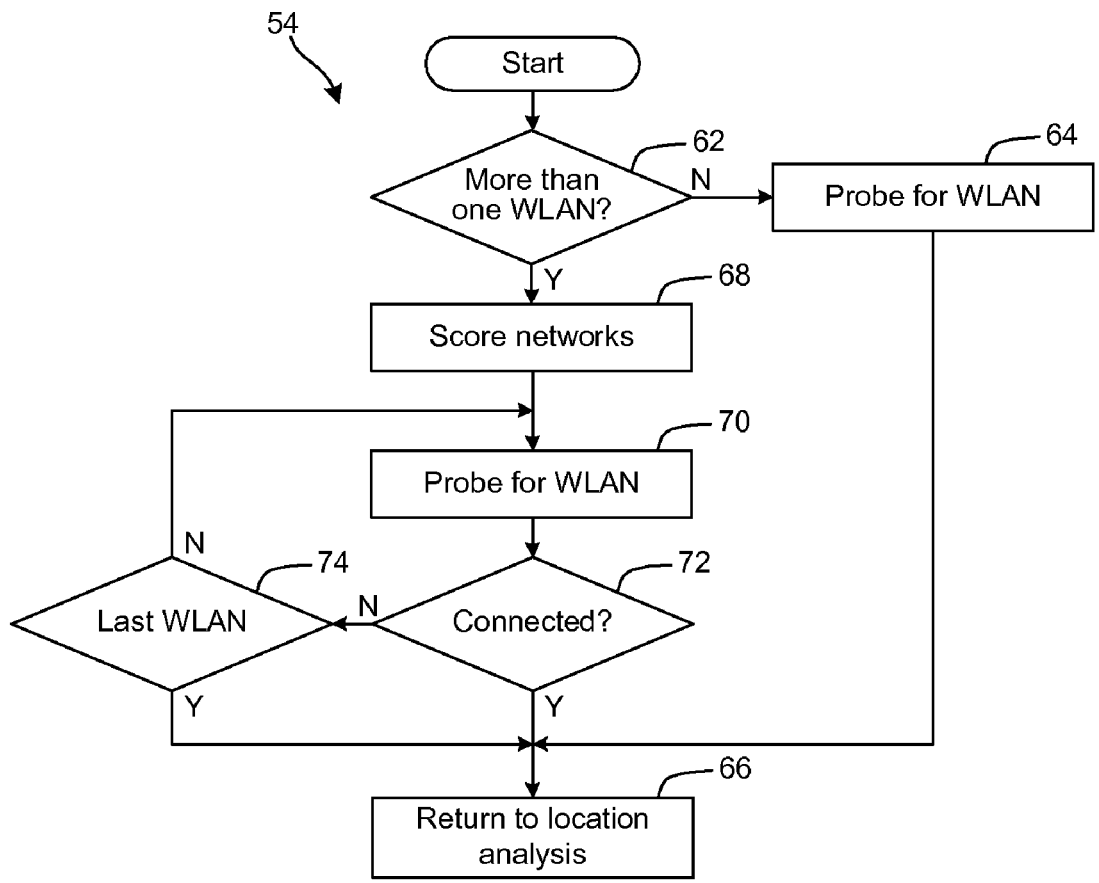
FIG. 5 is a flow chart representing an exemplary method of probing for one or more WLANs.

With additional reference to FIG. 5, illustrated are logical operations to implement an exemplary method of probing for one of the WLANs 18 (e.g., a method of carrying out block 54 from the logical flow of FIG. 4). The logical flow may start in block 62 where a determination is made as to whether there is more than one known WLAN 18. If there is not more than one known WLAN 18, then a negative determination may be made in block 62 and the logical flow may proceed to block 64. In block 64, the electronic device 10 may be controlled to probe for the WLAN. Thereafter, the logical flow may proceed to block 66 where the location analysis may be continued, such as by returning to block 30 of the logical flow of FIG. 4.

If there is more than one known WLAN 18, a positive determination may be made in block 62 and the logical flow may proceed to block 68. In block 68, each of the WLANs 18 may be scored. The WLANs 18 may be scored by ascertaining a maximal matching score based on the current update location L. For instance, the location L may be compared with each reference location M for each WLAN 18 to return a score for each comparison. The scoring may be carried out in the way that the scoring is carried out in block 36 and, for the sake of brevity, will not be described again. In one embodiment, the nested loops of blocks 50, 56 and 60 from FIG. 4 may be carried out to establish the scores, but where block 52 is omitted so that the logical flow proceeds directly from block 50 to block 56. For each WLAN 18, the highest score from comparing the location L with all of the reference locations M for the WLAN 18 may be retained as the maximal score for that WLAN 18. Then, the WLANs 18 may be ordered from highest maximal score to lowest maximal score. As will be appreciated, as the maximal score increases, the probability of connecting to the associated WLAN 18 increases.

The result of the scoring of block 68 may be an ordered list of WLANs 18, such as WLAN list N={[W1,S1], [W2,S2], ... [Wn,Sn]} where Wn corresponds to a WLAN identifier, and Sn is the maximal score corresponding to the WLAN for the location L. Also, the order of the WLAN/maximal score pairs may be arranged so that $S1 \geq S2 \geq \ldots \geq Sn$.

The process of scoring the WLANs 18 may be carried out using the logical steps identified in the following Pseudo-Code Listing 4, for example.

---
Pseudo-Code Listing 4
---
On decision to probe for known WLAN:
  For each WLAN_w
    Maximal Score = 0
    For each Location M associated with WLAN_w
      If Score(L,M) > Maximal Score value for WLAN_w then
        Maximal Score for WLAN_w = Score(L,M)
    Return Maximal Score
---

Following block 68, the logical flow may proceed to block 70 where, for the first iteration of block 70, the electronic device probes for the first WLAN 18 in the ordered list of WLANs 18. Next, in block 72 a determination may be made as to whether the electronic device 10 connects to the WLAN 18 for which a probe is made. If a connection is established, a positive determination may be made in block 72 and the logical flow may proceed to block 66. If a connection is not established, a negative determination may be made in block 72 and the logical flow may proceed to block 74.

In block 74, a determination may be made as to whether a probe has been made for the last WLAN 18 in the ordered list of WLANs 18. If a probe has not been made for all of the WLANs 18 in the ordered list, the logical flow may return to block 70 to initiate a probe for the next WLAN 18 in the ordered list. If a probe has been made for all of the WLANs 18, a positive determination may be made in block 74 and the logical flow may proceed to block 66.

With renewed reference to FIGS. 1 and 2, additional details of the electronic device 10 will be described. The electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The electronic device 10 may include a display 76. The display 76 displays information to a user such as operating state, time, telephone numbers, contact information, various menus, etc., that enable the user to utilize the various features of the electronic device 10. The display 76 also may be used to visually display content received by the electronic device 10 and/or retrieved from a memory 78 (FIG. 2) of the electronic device 10. The display 76 may be used to present images, video and other graphics to the user, such as photographs, mobile television content and video associated with games.

A keypad 80 provides for a variety of user input operations. For example, the keypad 80 may include alphanumeric keys for allowing entry of alphanumeric information such as telephone numbers, phone lists, contact information, notes, text, etc. In addition, the keypad 80 may include special function keys such as a "call send" key for initiating or answering a call, and a "call end" key for ending or "hanging up" a call. Special function keys also may include menu navigation and select keys to facilitate navigating through a menu displayed on the display 76. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 76. Also, the display 76 and keypad 80 may be used in conjunction with one another to implement soft key functionality.

The electronic device 10 includes call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a voice call or a video enabled call.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 78, executing applications to allow user interaction with the data, displaying video and/or image content associated with the data, outputting audio sounds associated with the data, and so forth.

FIG. 2 represents a functional block diagram of the electronic device 10. For the sake of brevity, many features of the electronic device 10 will not be described in great detail. The electronic device 10 includes a primary control circuit 82 that is configured to carry out overall control of the functions and operations of the electronic device 10. The control circuit 82 may include a processing device 84, such as a central processing unit (CPU), microcontroller or microprocessor. The processing device 84 executes code stored in a memory (not shown) within the control circuit 82 and/or in a separate memory, such as the memory 78, in order to carry out operation of the electronic device 10.

The memory 78 may be, for example, one or more of a buffer, a flash memory, a hard drive, a removable media, a volatile memory, a non-volatile memory, a random access memory (RAM), or other suitable device. In one arrangement, the memory 78 may include a non-volatile memory (e.g., a NAND or NOR architecture flash memory) for long term data storage and a volatile memory that functions as system memory for the control circuit 82. The volatile memory may be a RAM implemented with synchronous dynamic random access memory (SDRAM), for example. The memory 78 may exchange data with the control circuit 82 over a data bus. Accompanying control lines and an address bus between the memory 78 and the control circuit 82 also may be present.

The processing device 84 may execute code that implements the WLAN proximity evaluation function 12. It will be apparent to a person having ordinary skill in the art of computer programming, and specifically in application programming for mobile telephones or other electronic devices, how to program a electronic device 10 to operate and carry out logical functions associated with the WLAN proximity evaluation function 12. Accordingly, details as to specific programming code have been left out for the sake of brevity. Also, while the WLAN proximity evaluation function 12 is executed by the processing device 22 and stored by the memory 78 in accordance with an embodiment, such functionality could also be carried out via dedicated hardware or firmware, or some combination of hardware, firmware and/or software.

Continuing to refer to FIGS. 1 and 2, the electronic device 10 includes an antenna 86 coupled to a radio circuit 88. The radio circuit 88 includes a radio frequency transmitter and receiver for transmitting and receiving signals via the antenna 86. The radio circuit 88 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, digital video broadcasting-handheld (DVB-H), integrated services digital broadcasting (ISDB), etc., as well as advanced versions of these standards. It will be appreciated that the antenna 86 and the radio circuit 88 may represent one or more than one radio transceiver.

The electronic device 10 further includes a sound signal processing circuit 90 for processing audio signals transmitted by and received from the radio circuit 26. Coupled to the sound processing circuit 90 are a speaker 92 and a microphone 94 that enable a user to listen and speak via the electronic device 10. The radio circuit 88 and sound processing circuit 90 are each coupled to the control circuit 82 so as to carry out overall operation. Audio data may be passed from the control circuit 82 to the sound signal processing circuit 90 for playback to the user. The audio data may include, for example, audio data from an audio file stored by the memory 78 and retrieved by the control circuit 82, or received audio data such as in the form of streaming audio data from a mobile radio service. The sound processing circuit 90 may include any appropriate buffers, decoders, amplifiers and so forth.

The display 76 may be coupled to the control circuit 82 by a video processing circuit 96 that converts video data to a video signal used to drive the display 76. The video processing circuit 96 may include any appropriate buffers, decoders, video data processors and so forth. The video data may be generated by the control circuit 82, retrieved from a video file that is stored in the memory 78, derived from an incoming video data stream that is received by the radio circuit 88 or obtained by any other suitable method.

The electronic device 10 may further include one or more I/O interface(s) 98. The I/O interface(s) 98 may be in the form of typical mobile telephone I/O interfaces and may include one or more electrical connectors. As is typical, the I/O interface(s) 98 may be used to couple the electronic device 10 to a battery charger to charge a battery of a power supply unit (PSU) 100 within the electronic device 10. In addition, or in the alternative, the I/O interface(s) 98 may serve to connect the electronic device 10 to a headset assembly (e.g., a personal handsfree (PHF) device) that has a wired interface with the electronic device 10. Further, the I/O interface(s) 98 may serve to connect the electronic device 10 to a personal computer or other device via a data cable for the exchange of data. The electronic device 10 may receive operating power via the I/O interface(s) 98 when connected to a vehicle power adapter or an electricity outlet power adapter. The PSU 100 may supply power to operate the electronic device 10 in the absence of an external power source.

The electronic device 10 also may include a system clock 102 for clocking the various components of the electronic device 10, such as the control circuit 82 and the memory 76.

The electronic device 10 may include a camera 104 for taking digital pictures and/or movies. Image and/or video files corresponding to the pictures and/or movies may be stored in the memory 78.

The electronic device 10 also may include a position data receiver 106, such as a global positioning system (GPS) receiver, Galileo satellite system receiver or the like. The position data receiver 106 may be involved in determining the geographic position of the electronic device 10.

The electronic device 10 also may include a local wireless interface 108, such as an infrared transceiver and/or an RF interface (e.g., a Bluetooth interface), for establishing communication with an accessory, another mobile radio terminal, a computer or another device. For example, the local wireless interface 108 may operatively couple the electronic device 10 to a headset assembly (e.g., a PHF device) in an embodiment where the headset assembly has a corresponding wireless interface.

Although certain embodiments have been shown and described, it is understood that equivalents and modifications falling within the scope of the appended claims will occur to others who are skilled in the art upon the reading and understanding of this specification.

What is claimed is:

1. A method of initiating a probe for a WLAN by a generic access network enabled electronic device, comprising:
    generating a current location metric for the electronic device, the current location metric being a list of cellular communication base station identifiers that have a relationship to a current position of the electronic device and are ordered in accordance with respective signal strength values that are ascertained at the current position;
    scoring the current location metric against a reference location metric for the WLAN, the reference location metric being a list of cellular communication base station identifiers that have a relationship to a former position of the electronic device where the electronic device was connected to the WLAN and the base station identifiers for the reference location metric are ordered in accordance with respective signal strength values that were ascertained at the former position, the scoring accomplished by generating a matching score having a value to quantify a correlation between the order of the base station identifiers in the current location metric and the order of the base station identifiers in the reference location metric; and
    if the electronic device is connected to the WLAN:
        if the matching score has a value so that the current location metric has less than a first predetermined threshold geographic correlation with the reference location metric, associating the current location metric with the WLAN as an additional reference location metric to create a logical map of a coverage area of the connected WLAN;
        else, if the current location metric has greater than a second predetermined threshold geographical correlation to the reference location metric, initiating the probe; and
        wherein if the electronic device is not connected to the WLAN, establishing a delay duration until a next current location metric for the electronic device is generated, the delay duration based on a geographical correspondence between the current location metric and the reference location metric as indicated by the matching score.

2. The method of claim 1, wherein the matching score is reduced if the current location metric contains a base station identifier that is not in the reference location metric.

3. The method of claim 1, wherein there are multiple WLANs and the WLANs are probed in an order determined by:
    for each WLAN, comparing the current location metric to reference location metrics for the WLAN to generate a geographic matching score for each comparison and determining a maximum one of the matching scores; and
    ordering the WLANs based on the maximum matching score for each WLAN.

4. The method of claim 1, wherein the reference location metric has a highest geographical correspondence to the current location metric from a plurality of reference location metrics.

5. A method of evaluating proximity of an electronic device to a WLAN, comprising:
    generating a current location metric for the electronic device, the current location metric defined by a list of cellular communication base station identifiers that is ordered based on signal strength values for each base station identifier;
    scoring the current location metric for geographic correspondence to one or more reference location metrics, each reference location metric corresponding to a position at which the electronic device was connected to the WLAN and is defined by a list of cellular communication base station identifiers that are sorted based on signal strength values for each base station identifier at a time when the reference location metric was established, the scoring for each reference location metric accomplished by generating a matching score having a value to quantify a correlation between the order of the base station identifiers in the current location metric and the order of the base station identifiers in the reference location metric;
    probing for the WLAN if the matching score is greater than a predetermined threshold; and
    establishing a delay duration until a next current location metric for the electronic device is generated, the delay duration based on a geographical correspondence between the current location metric and the one or more reference location metrics as indicated by the matching score.

6. The method of claim 5, wherein the matching score is reduced if the current location metric contains a base station identifier that is not in the reference location metric.

7. The method of claim 5, wherein there are multiple WLANs and the WLANs are probed in an order determined by:
    for each WLAN, comparing the current location metric to reference location metrics for the WLAN to generate a geographic matching score for each comparison and determining a maximum one of the matching scores; and
    ordering the WLANs based on the maximum matching score for each WLAN.

8. A generic access network enabled mobile electronic device, comprising:
    a radio circuit that establishes communications with a core mobile communications network over a cellular communications base station or a WLAN depending on WLAN availability; and
    a controller that evaluates proximity to the WLAN, wherein the controller is configured to:
        generate a current location metric for the electronic device, the current location metric defined by a list of cellular communication base station identifiers that is ordered based on signal strength values for each base station identifier;
        score the current location metric for geographic correspondence to one or more reference location metrics to generate a matching score for each reference location metric, each reference location metric corresponding to a position at which the electronic device was connected to the WLAN and is defined by a list of cellular communication base station identifiers that are sorted based on signal strength values for each base station identifier at a time when the reference location metric was established, the matching score having a value to quantify a correlation between the order of the base station identifiers in the current location metric and the order the base station identifiers in the reference location metric;

probe for the WLAN if the matching score is greater than a predetermined threshold; and establish a delay duration until a next current location metric for the electronic device is generated, the delay duration based on a geographical correspondence between the current location metric and the one or more reference location metrics as indicated by the matching score.

9. The electronic device of claim 8, wherein the matching score is reduced if the current location metric contains a base station identifier that is not in the reference location metric.

10. The electronic device of claim 8, wherein there are multiple WLANs and the controller is further configured to:
for each WLAN, compare the current location metric to reference location metrics for the WLAN to generate a geographic matching score for each comparison and determine a maximum one of the matching scores;
establish an order for the WLANs based on the maximum matching score for each WLAN; and
control the electronic device to probe for the WLANs in the order of the WLANs.

* * * * *